United States Patent [19]

Okamoto

[11] Patent Number: 4,540,742
[45] Date of Patent: * Sep. 10, 1985

[54] GRAFT COPOLYMERS AND PROCESS FOR THEIR PREPARATION

[75] Inventor: Yoshihisa Okamoto, Sagamore Hills, Ohio

[73] Assignee: The B. F. Goodrich Company, Akron, Ohio

[ * ] Notice: The portion of the term of this patent subsequent to May 29, 2001 has been disclaimed.

[21] Appl. No.: 440,916

[22] Filed: Nov. 12, 1982

[51] Int. Cl.$^3$ .................. C08F 251/02; C08E 261/12; C08G 59/00
[52] U.S. Cl. ...................................... 525/61; 525/100; 525/286; 525/349; 525/375; 525/385; 525/407; 525/409; 525/523; 525/930; 527/300; 527/312
[58] Field of Search ................. 525/61, 349, 286, 385, 525/409, 375, 523, 930, 100, 407; 527/312, 300

[56] References Cited

U.S. PATENT DOCUMENTS

| | | | |
|---|---|---|---|
| 3,864,288 | 2/1975 | Riew et al. | 525/409 |
| 4,251,404 | 2/1981 | Simms | 527/312 |
| 4,256,910 | 3/1981 | Hsu | 528/409 |
| 4,451,618 | 5/1984 | Okamoto | 525/349 |

Primary Examiner—Allan M. Lieberman
Attorney, Agent, or Firm—Alfred D. Lobo; Nestor W. Shust

[57] ABSTRACT

Under particular conditions, a cationic ring-opening polymerization of an oxirane monomer selected from the group consisting of an acyclic glycidyl ether, a cyclic glycidyl ether, and a haloalkyl epoxide, in the presence of a hydroxyl-containing backbone of a polymer ("HCB") and a particular catalyst, produces a polymerization having 'living polymerization' characteristics, provided the OH groups are aliphatic OH groups and not aromatic OH groups. The result is a graft copolymer the molecular weight (mol wt) of which is directly proportional to the conversion of the monomer. The HCB, which may have from 1 to about 400 pendant OH groups, and more preferably at least 7 pendant OH groups, provides grafting sites for the grafting segments. Where a grafted segment contains halogen, the segment may be aminated. If the HCB is hydrophobic, the aminated block copolymer is amphiphilic.

22 Claims, No Drawings

GRAFT COPOLYMERS AND PROCESS FOR THEIR PREPARATION

BACKGROUND OF THE INVENTION

This invention relates to the art of preparing a graft copolymer by grafting from a polymer backbone (hereafter "backbone"), so that an oxirane polymer grafted from the backbone has a clearly defined chain length and a narrowly defined, controlled molecular weight (mol wt), substantially free from homopolymer residues. The graft copolymers of this invention are not formed by grafting onto a backbone, therefore the process is characterized by very high, if not nearly perfect grafting efficiency. (see "Cationic Grafting: A Critical Review" by Kennedy, J. P., *J. Appl. Poly. Sci.: Appl. Poly. Symposium* 30, 1–11, 1977). By "graft copolymer" I specifically refer to a copolymer of one polymer attached to the backbone of another polymer which is linear, at various points along the backbone. Nothing in the prior art enables one to prepare such a graft copolymer by cationic ring-opening polymerization. With respect even to the general art of cationic polymerization, Prof. Joseph Kennedy said "Cationic polymerizations have only very recently emerged from the dark middle ages and reached the point where systematic tailoring of polymer structures became possible." (see *Isotopics*, pg 4, May 1982)

In the known art of synthesis of graft copolymers by ring-opening polymerization, whether anionic or cationic, there is no suggestion how a graft copolymer with tailored chain lengths of grafted polymer chains may be made. Thus there is no basis for assessing the properties of such a graft copolymer. Further, it will be appreciated that an assessment of the probability that the little-understood process of cationic ring-opening polymerizaton of a monomer to a backbone with pendant hydroxyl (OH) groups will provide a graft copolymer with any particular structure and desirable properties such as controllable block length and thermal stability, is speculative.

The difficulty of tailoring related block or graft copolymers, generally, by cationic ring-opening polymerization so as to provide a mol wt within a narrow range and well-defined functionality, or with high graft efficiency free from homopolymer, is well known. (see Kennedy publications, supra). Recently, novel block and graft copolymers based on the di- and multicationically ended living polyacetals and polyethers have been shown to be formed without a hydroxyl-containing material, and under anhydrous conditions. See *Cationic Ring-Opening Polymerization,* by Stanislaw Penczek, Polish Academy of Sciences, Center of Molecular and Macromolecular Studies, 90–362 Lodz, Poland; see *Makromol. Chem., Suppl.,* 3, 17–39 (1979). This work appears to confirm the teachings of the Dreyfuss U.S. Pat. No. 3,850,856 that OH groups would 'kill' the system, if it were a living one.

This invention is particularly directed to a process for making certain graft copolymers by polymerizing an oxirane monomer from a hydroxyl-containing substantially linear backbone polymer (hereinafter "HCB", for brevity) which serves as the chain propagator furnishing pendant OH groups as chain propagation sites from which the oxirane polymer is grafted; and, which process, relies upon a living polymerization generated by the catalytic action of a fluorinated acid catalyst having the formula $HMF_6$ wherein M is selected from phosphorus, arsenic and antimony; or, an oxonium salt of the acid. The process of my invention yields graft copolymers which persons skilled in the art were unable to make with the teachings of the prior art, or believed they could not make, before the discovery of my process.

More specifically, the graft copolymers of my invention are made by a living cationic ring-opening polymerization of an oxirane monomer grafted from sites furnished by the HCB in the presence of a known catalyst disclosed in U.S. Pat. No. 3,585,227, and in U.S. Pat. No. 3,850,856, the disclosures of which are incorporated by reference herein as if fully set forth. The polymerization disclosed in U.S. Pat. No. 3,850,856 was based on water, or ethylene glycol terminating the growing polymer chains by introducing hydroxyl (OH) groups at the terminal positions. This polymerization has now been discovered to be a living polymerization as described more fully in copending patent applications Ser. Nos. 418,341 filed Sept. 9, 1982 now U.S. Pat. No. 4,485,211 and 427,370 filed Sept. 29, 1982, now U.S. Pat. No. 4,451,618, the disclosures of which are incorporated by reference thereto as if fully set forth herein. This living polymerization is quite surprising since it is well known that "The nature of the processes involved in cationic copolymerisations of monomer mixtures, and the experimental limitations which they impose, have made this synthetic route to block copolymers generally unsatisfactory, at least for most comonomer pairs." (see *Block Copolymers,* by Allport, D. C. and Janes, W. H., pg 354, John Wiley & Sons, 1973). Implicitly, this corroborates a prejudice against cationic living polymerization systems.

Further, since known polymers such as those described in the '856 patent are clearly stated to be hydroxyl-ended, because of the use of water or glycol, there was no motivation to explore the possibility that a backbone wih plural pendant OH groups intermediate its ends might function as polymer grafting sites because the manner analogous to that in which water or a glycol furnish chain propagating sites was unknown. Nor was it then realized that the choice of propagator (having OH propagating groups), and particularly a propagator having at least five aforementioned pendant OH groups would result in graft copolymers having quite different structures from those of the prior art copolymers.

Nevertheless, it has now been found that, under certain conditions, growth of a graft copolymer is propagated from OH groups in a HCB, which growth occurs in a well-definable living polymerization system. More particularly, it now appears that the structure of the residue of the HCB chain propagator, whatever its length, does not adversely affect the growth of a graft copolymer, but generates a living system able to grow preselected blocks, so that the overall polymer weight, the polymer segmental weight, and the polymer's functionality are each narrowly defined.

Epihalohydrin polymers formed by cationic polymerization with triethyloxonium hexafluorophosphate (TEOP) are known to be formed as disclosed in U.S. Pat. No. 3,850,857. However, neither the molecular weight of the polymers nor their functionality can be narrowly controlled, resulting in the loss of control of the polymers' properties. In contrast, the unexpectedly close control of molecular weight and high grafting efficiency without oxirane homopolymerization obtained with my invention facilitates the production of a variety of tailored graft copolymers which are not only useful as film-formers, viscosity increasing agents, dispersing agents for polymerization, and the like, but also for mineral beneficiation where highly specific properties are essential to the making of sharp, and hence profitable, separations.

Such close control of mol wt and high grafting efficency is only possible because this oxirane cationic ring-opening polymerization has the unique characteristics of a living polymerization in which the mol wt of the polymer is increased directly with the amount of monomer converted to polymer, and each OH group provides a grafting site (propagating site).

Some two decades ago, it was known that hydroxyl group-containing compounds are condensed with epoxyalkyl halides in the presence of fluoboric catalysts as disclosed in U.S. Pat. No. 3,129,232. Soon thereafter it was shown in U.S. Pat. No. 3,305,565 that water is an initiator in the presence of various acid catalysts forming halo-hydroxyl terminated polymers which could be epoxidized. More recently, terminally unsaturated liquid epihalohydrin polymers have been disclosed in U.S. Pat. No. 4,256,910 which are relatively low in molecular weight, in which a homopolymer of an epihalohydrin, or a random copolymer of two or more epihalohydrins, or copolymers of an epihalohydrin with a vicinal epoxide, are formed using the same TEOP catalyst as used in U.S. Pat. No. 3,850,856 process. However, there is neither any indication that the hydroxyalkyl (meth)acrylate used in U.S. Pat. No. 4,256,910 functioned as a chain propagator, nor that the mol wt and functionality of the polymer were narrowly defined.

U.K. Patent Application No. 2,021,606A teaches that hydroxyl-terminated poly(chloroalkylene ethers) have not proven entirely satisfactory when prepared by cationic ring-opening polymerization as disclosed in U.S. Pat. Nos. 3,850,856; 3,910,878; 3,910,879; and, 3,980,579. Thus, the problems inherent in the use of prior art catalysts referred to in the foregoing U.S. patents have been documented. A solution to the problems was provided in the British patent application. This solution was to use a catalyst comprising (i) a fluorinated acid catalyst having the formula $H_mXF_{n+m}$ wherein X is selected from boron, phosphorus, arsenic and antimony, m is 0 or 1 and n is 3 when X is boron and n is 5 when X is phosphorus, arsenic and antimony, and, (ii) a polyvalent tin compound.

This British patent teaches that only tin fluorometallic compounds even among other Group IV metals, has a peculiar catalytic action not attributable to Group V fluorometallic compounds. With this catalyst, it is suggested that any hydroxyl-containing material ("HCM") having up to six (6) OH groups, whether terminal or pendant, may be used in the formation of a polymer with an alkylene oxide, provided at least about 50% by weight (wt) of the alkylene oxide is a chloroalkylene oxide.

Among such HCMs are disclosed water, and any liquid or solid organic material which has a hydroxyl functionality of up to six (6), whether such material is monomeric or polymeric. Less generally, polyhydric alkanols, haloalkanols and polymeric polyols are disclosed, including hydroxyl-terminated polyalkadienes and polyether polyols.

Specifically disclosed HCMs are glycerol, sorbitol and polyoxyethylene and polyoxypropylene glycols and triols of molecular weights from about 200 to about 2000. My experiments with OH-terminated polyoxyethylene and polyoxypropylene which are detailed in my copending application Ser. No. 427,370, failed to yield block copolymers with epichlorohydrin despite my having continued the polymerization reaction for more than 80 hr., probably due to the back-biting mechanism (see *Advances in Polymer Science,* Vol 23, pg 128, by E. J. Goethals, published by Springer-Verlag, Berlin Heidelberg New York, 1977) which results in its depolymerization forming a stable 6-membered ring. Only when the equilibrium of the reaction was heavily biased by using a large excess of monomer and catalyst, deliberately, because of the understanding acquired from my present invention, was there a small amount of block copolymer formed.

With glycerol, a branched polymer is also formed. With polyoxypropylene triol, a three-branched block copolymer is formed. If sorbitol were an effective HCM, a six-branched copolymer might have been expected to be formed. However, sorbitol like cellulose is not soluble in oxirane monomers and no mutual solvent is known which will not deleteriously affect the catalyst. My experiments with sorbitol failed to produce a six-branched copolymer; glucose and sucrose also failed to yield five- and eight-branched chains respectively; and, cellulose failed to yield any copolymer.

Despite the structure written in the British reference, the overly broad disclosure failed to disclose the essential requirements for grafting from pendant OH groups of a polymer backbone so as to form a graft copolymer, and more particularly, failed to recognize that it was essential for the formation of a graft copolymer that the HCB be soluble in the monomer to be grafted from it, even if a mutual solvent is necessary to provide a substantially homogeneous reaction mass.

Amphiphilic block copolymers have been found especially useful in water treatment processes, and as the main constituent of nonaqueous lyotropic liquid crystals. A lyotropic liquid crystal, by definition, consists essentially of an amphiphilic compound and a solvent. The latter modifies the structure of the amphiphile from solid or liquid to liquid crystalline by changing the environment around the polar part of the amphiphile. Numerous examples of such lyotropic mesoaggregates with biological importance have been reported in which the solvent may be water or an organic hydroxy compound. Among these organic compounds found to give nonaqueous liquid crystals were different chain length alkanediols, low molecular weight polyethylene glycols, different cellosolves and some amines. (see "Nonaqueous Lyotropic Liquid Crystals from Lecithin and Nonionic Surfactants" by Li Ganzuo et al. in *Mol. Cryst. Liq. Cryst.* Vol 72 (Letters), pp 183–188).

More recently, two-headed, single-chain amphiphiles have been disclosed which produce huge aggregates in dilute aqueous solutions. A flexible decaethylene unit and a rigid diphenylazomethine or biphenyl unit were found to produce aggregates with a rod-like structure so as to form a monolayer or bilayer membrane. (see *J. Am. Chem. Soc.* 101, 5231, 1979).

This intrinsic property of lyotropic mesomorphism exhibited by block copolymers with amphiphilic properties, results in the formation of a thermodynamically stable liquid crystalline system through the penetration of a solvent between the molecules of a crystal lattice. These lyotropic mesoaggregates usually form ordered lattices in one or two directions which cause characteristic anisotropy. See *Lyotropic Liquid Crystals and the Structure of Biomembranes,* edited by Stig Friberg, in a chapter titled "Lyotropic Mesomorphism—Phase Equilibria and Relation to Micellar Systems", by Ingvar Danielsson, *Advances in Chemistry Series* 152, published by A. C. S. 1976. This property has been used to synthesize stable, model membranes which can be used to study biological processes, particularly those characterized by a lipid bilayer membrane.

Though graft copolymers of this invention are not structurally similar to the AB type block copolymers which form liquid crystals, it was expected that the propensity of the block copolymers to form a layered structure in which the molecules are so tightly packed as to form an anisotropic mesoaggregate or liquid crystalline structure, would also likely result from the amination of the graft copolymers of this invention. If such a structure did in fact result, it was evident that further amination of the molecules, more particularly halogen-containing chains thereof, would be obstructed, except for portions of those molecules near the surface of the huge aggregates expected to be formed. It is not. Quite surprisingly, the graft copolymers of this invention may be aminated essentially completely, if so desired, thus forcing the conclusion that the structure of the aminated copolymers of this invention, whether on a submicroscopic or macroscopic scale, is quite distinct from the prior art aminated block copolymers.

SUMMARY OF THE INNVENTION

It has unexpectedly been found that any single ring-openable oxirane monomer selected from the group consisting of an acyclic glycidyl ether, a cyclic glycidyl ether, and a haloalkyl epoxide, may be grafted from OH groups in a hydroxyl-containing hydrocarbon or polyether backbone ("HCB") in the presence of a particular catalyst, by a polymerization having 'living polymerization' characteristics, provided the OH grafting sites are aliphatic OH groups. A further condition is that the HCB be soluble (hence referred to herein as "soluble HCB") in the oxirane monomer, optionally with a mutual solvent which does not adversely affect the catalyst, so that the graft copolymer formed is free of homopolymer. The resulting graft copolymer of this invention possesses a designed (particularly desired) molecular weight (mol wt) which is directly proportional to the conversion of the monomer to the graft copolymer, which is formed with high graft efficiency and essentially free of homopolymer.

It is therefore a general object of this invention to provide graft copolymers in which the molar ratio of oxirane monomer to OH group in the HCB is always greater than 1, whereby the mol wt of the graft copolymer may be controlled by adjusting the ratio of oxirane monomer to HCB, provided it consists essentially of a hydrocarbn prepolymer, optionally containing an ether linkage in a repeating unit.

Essential requirements of this cationic ring-opening living polymerization for grafting one of the aforespecified oxirane monomers from a pendant OH group in an HCB has been found to be the use of (i) a catalytic amount of a catalyst (initiator) which may be either a fluorinated metallic acid catalyst having the formula $HMF_6$ wherein M is selected from phosphorus, arsenic and antimony; or, an oxonium salt of the acid; (ii) the HCB chain propagator must have at least one (1) pendant OH group, and preferably at least seven (7) pendant OH groups, the remaining (if any) being terminal OH groups; and, (iii) the HCB is soluble in the oxirane monomer, optionally in the presence of a mutual solvent, so as to form a substantially homogeneous reaction mass.

It is therefore a general object of this invention to provide a process for the manufacture of a graft copolymer of an aforespecified HCB and an oxirane monomer, which process comprises, (i) polymerizing, an oxirane monomer selected from the group consisting of an acyclic glycidyl ether, a cyclic glycidyl ether, and a haloalkyl epoxide, from an HCB in the presence of a catalytic amount of a catalyst selected from the group consisting of an $HMF_6$ acid, and, an oxonium salt of the $HMF_6$ acid, wherein M is an element selected from the group consisting of phosphorus, arsenic and antimony, and, (ii) recovering said graft copolymer which is formed with high graft efficiency, essentially free from homopolymer, in a molar amount directly proportional to the conversion of the monomer.

It is another general object of this invention to provide novel graft copolymers prepared by a process which comprises polymerizing (A) a single ring-openable oxirane monomer selected from the group consisting of (i) an aliphatic or aromatic glycidyl ether having the structure

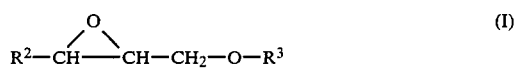

$$R^2-CH\overset{O}{-\!\!-\!\!-}CH-CH_2-O-R^3 \qquad (I)$$

wherein $R^2$ and $R^3$ is each independently selected from the group consisting of hydrogen, or a substituted group such as a hydrocarbon group, i.e. alkyl or substituted alkyl, particularly haloalkyl, alkenyl or substituted alkenyl, particularly haloalkenyl, alkoxyalkyl, aryl (Ar) or substituted aryl (Ar-Q), particularly wherein Q is selected from the group consisting of alkyl, haloalkyl each having from 1 to about 10 carbon atoms, alkenyl and haloalkenyl each having from 2 to about 10 carbon atoms; and, (ii) a haloalkyl epoxide having the structure

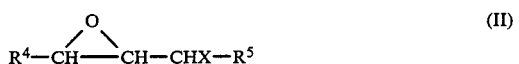

$$R^4-CH\overset{O}{-\!\!-\!\!-}CH-CHX-R^5 \qquad (II)$$

wherein X is a halogen atom and $R^4$ and $R^5$ is each independently selected from the group consisting of hydrogen and alkyl having from 1 to about 4 carbon atoms, with (B) a HCB consisting essentially of a hydrocarbon polymer optionally containing an ether linkage in a repeating unit, said HCB having at least 1 pendant OH group, and optionally, from 0 to 4 terminal OH groups, in the presence of a catalytic amount of a catalyst selected from the group consisting of a hexafluoro acid having the formula $HMF_6$ wherein M is a Group V element selected from phosphorus, arsenic and antimony, and oxonium salts of said hexafluoro acid, to yield a block copolymer having the structure

$$R^1[O-[A]_a-H]_b \qquad (III)$$

wherein, $R^1$ represents the residue of said HCB which originally contains from 1 to about 400 pendant hydroxyl groups intermediate the ends of said HCB;

A represents said oxirane monomer;

so that the molecular weight of the resulting block copolymer is directly proportional to the amount of monomer converted; and, a represents an integer in the range from about 1 to about 100;

b represents an integer in the range from 1 to about 400;

so that the molecular weight of each of the segments of the graft copolymer is in the range from about 100 to about 10,000, and the molecular weight of the graft block copolymer is in the range from about 2000 to about 500,000.

It is a specific object of this invention to provide a graft copolymer of (A) epichlorohydrin, and (B) a HCB selected from the group consisting of hydroxyalkyl cellulose, polyvinylacetals having an OH content of from 1 to about 20%, poly(hydroxy ether) resins such as phenoxy resins having an OH content of from 1 to about 10%, copolymers of monoolefinically unsaturated alcohols with monoolefins and diolefins having an OH content of from 1 to about 20%, and copolymers of vinyl aromatic monomers with monoolefinically unsaturated alcohols having an OH content of from 1 to about 20%, each member of the group characterized by having from 7 to about 100 pendant OH groups, optionally including additional terminal OH groups, and having a mol wt in the range from about 1000 to about 200,000; in the presence of a catalytic amount of the $HMF_6$ acid, or the oxonium salt of the $HMF_6$ acid, preferably a trialkyl oxonium salt, whereby the graft copolymer formed is directly proportional to the amount of the epichlorohydrin converted and the graft copolymer has a mol wt in the range from about 5000 to about 500,000.

It has further been discovered that the choice of the HCB chain propagator is wholly determinative of the structure of a graft copolymer formed by a living cationic ring-opening polymerization of a ring-openable oxirane monomer in the presence of the HCB, under conditions favorable to the polymerization. Such conditions are mild, namely, ambient pressure and a temperature in the range from about 0° C. to about 100° C., generally in a bulk or mass polymerization system, though a solvent may be used in a solution polymerization to facilitate interaction of the reactants.

It is therefore another specific object of this invention to provide a graft copolymer as defined hereinabove having a total of from 7 to about 100 pendant and terminal hydroxyl groups each of which is a grafting site for at least one repeating unit of epichlorohydrin.

It has still further been discovered that a graft copolymer of a HCB and a halogenated glycidyl ether, or a haloalkyl epoxide, may be aminated (quaternized) under elevated temperature and pressure, despite the presence of a segment in the graft copolymer which is not aminatable. Such amination has been found to occur even when the non-aminatable segment constitutes a major proportion by weight of the graft copolymer. The amination of a halosubstituted segment of the graft copolymer may be carried out to any desired extent despite any aggregative packing of molecules which may occur.

DETAILED DESCRIPTION OF PREFERRED EMBODIMENTS

The cationic ring-opening living polymerization disclosed herein occurs because of the specific catalyst used with an organic hydroxyl-containing backbone polymer ("HCB") having from 2 to about 400 pendant hydroxyl groups, and a mol wt in the range from about 500 to about 500,000. Grafting an oxirane monomer from the HCB in which pendant OH groups are grafting sites for the formation of a graft copolymer of a ring-openable oxirane monomer, was not known (see "Cationic Grafting: A Critical Overview" by J. P. Kennedy, supra). Two terminal aliphatic OH groups provide propagating sites which result in a linear polymer, three or four terminal OH groups result in the formation of branched block copolymers such as are disclosed in my copending patent application Ser. No. 427,370 filed Sept. 29, 1982. When one or more pendant, that is, other than terminal, aliphatic OH groups are present, a graft copolymer is formed. By "pendant aliphatic OH group" I specifically refer to one which is attached to the polymer backbone without a polymer chain.

The number of grafted oxirane polymer chains in the structure (III) of the graft copolymer formed, is determined by the the number of grafting sites (pendant OH groups) on the HCB, and the particular oxirane monomer to be grafted from the HCB. The graft copolymer is formed provided the HCB is soluble in the oxirane monomer, or vice versa, or a mutual solvent for the HCB and the oxirane monomer is found so as to form a substantially homogeneous reaction mass.

If the HCB and oxirane monomer are not mutually soluble, or no mutual solvent is found, the polymerization will not proceed; and, if it does proceed, will produce a mixture of graft copolymer with homo(oxirane)-polymer and unreacted HCB resulting in low grafting efficiency, and so low a rate of formation of the graft copolymer as to be uneconomical.

In the preferred embodiment of the invention, the graft copolymer (III) is formed by the action of a hexafluorometallic (Group V) acid catalyst, or oxonium salt thereof, in the presence of the soluble HCB brought into contact with either (i) a ring-openable glycidyl ether having the structure (I) written hereinabove, or (ii) a haloalkyl epoxide having the structure (II), under mild reaction conditions, namely a temperature in the range from about 0° C. to about 150° C., and more preferably from about 25° C. to about 80° C., at ambient or slightly elevated pressure.

The catalyst is selected from a hexafluorometallic (Group V) acid, $HMF_6$ wherein M is an element selected from the group consisting of phosphorus, arsenic and antimony, such acids being $HPF_6$, $HAsF_6$, and $HSbF_6$; and, an oxonium salt of said acid. The catalyst is used in an amount sufficient to initiate the polymerization. It is preferred to use a cyclic or acyclic oxonium salt which may be primary, secondary or tertiary. The cyclic oxonium salt may be prepared by reaction of an acyclic oxonium salt with tetrahydrofuran. It is most preferred to use a trialkyloxonium or other oxonium salt of the $HMF_6$ acid prepared as described in U.S. Pat. No. 3,585,227. The amount of the catalyst used is not critical, from about 0.001 part to about 1 part per 100 parts by wt of oxirane reactants, and more preferably from about 0.01 to about 0.1 part, being generally sufficient. It is desirable, both for economic reasons and for control of the reaction, to keep the amount of catalyst used as low as possible.

As stated hereinabove, the number of the pendant hydroxyl groups on the HCB will determine the structure of the resulting HCB-alkylene oxide graft copolymer. Though a polymer chain may be grafted from a single pendant OH group, it is preferred that the HCB have a total of from about 7 to about 400 aliphatic OH groups at least 2 of which are pendant OH groups. It is a characteristic of the graft copolymers of this invention that essentially every pendant OH groups serves as a grafting site for a polymer chain. If terminal OH groups are present, they also serve as propagating sites, therefore the amount of the HCB used in the polymerization is critical since it determines the mol wt of the resulting HCB-alkylene oxide graft block copolymer. Whe a preselected amount of the HCB of chosen structure is employed, each OH group serves as a grafting or propagating site, and the growth of polymer continues until all the monomer is consumed.

The theoretical mol wt of the graft copolymer is calculated by the following equations:

$$\overline{M}n_s \text{ (graft segm't)} = ([\text{monomer}]/[\text{eq wt of HCB}] \times \text{mol wt of monomer}) \times (\%\text{conv.}/100)$$

and, $$\overline{M}n \text{ (graft copolymer)} = \overline{M}n_s \times \text{no. of OH groups in HCB} + \text{mol wt of HCB}$$

For example, polymerization of 298 g of poly(styrene-allyl alcohol) ("p[S-co-AA]" for brevity) having a mol wt of about 1600, and an OH content of 5.7% and 925 g of epichlorohydrin (ECH) produces a graft copolymer with a mol wt of 6558 at 100% conversion. Since this block copolymer possesses about 5.36 pendant hydroxyl groups, it has a theoretical hydroxyl equivalent weight (HEW) of 1223. Since the hydroxyl number is (56100/HEW), it (the OH No.) computes to be 45.8.

The benefit of the peculiar catalytic function of the $HMF_6$ acid, or oxonium salt thereof, is obtained with any soluble HCB having the structure $R^1(OH)_n$ wherein n represents an integer in the range from 1 to about 400, wherein at least 1, and more preferably from 7 to about 200 are pendant OH groups, the remaining groups (if any) being terminal. The HCB is necessarily free from any other group, that is other than OH, which other group may react in the presence of the catalyst used herein. The HCB may be a generally linear polymer having aliphatic, cycloaliphatic, or other hydrocarbyl repeating units including those having ethylenic unsaturation or aromatic repeating units, or ether linkages in the backbone, or non-polymeric pendant chains (having no repeating units) attached at various points on the backbone, provided the HCB carries at least one (1), and preferably five (5) or more, but generally not more than about four hundred (400) pendant aliphatic OH grafting sites. With more than 400 pendant OH groups, grafting from a OH group becomes hindered for steric reasons. Even when 400 or less pendant OH groups are present it may be desirable to negate the activity of a predetermined number of them, for steric reasons.

$R^1(OH)_n$ more preferably represents a substantially linear polymer having plural pendant OH groups, wherein $R^1$ is the residue of the polymer which is selected from the group consisting of hydroxyalkyl cellulose; phenoxy resins derived from polyhydroxy phenols and epihalohydrins; copolymers of a monoolefinically unsaturated alcohol with an olefin; and, copolymers of vinyl aromatic monomers with monoolefinically unsaturated alcohols, each member of the group characterized by having from 7 to about 200 pendant OH groups represented by 'n' in the graft copolymer, and, optionally from 0 to about 4 terminal OH groups; whereby essentially every OH group serves as a grafting or propagating site for at least one molecule of an oxirane monomer, and preferably from 1 to about 100 molecules in each chain grafted from a OH site.

Preferred HCBs are those which are commercially available relatively easily, and include copolymers of monoolefins (which may be substituted), with vinyl or allyl alcohol, wherein the OH content is in the range from about 1 to about 20 percent, for example poly(ethylene-vinyl alcohol), poly(propylene-vinyl alcohol), poly(vinyl chloride-vinyl alcohol), poly(vinyl alcoholbutadiene), and poly(vinylalkyl ether-vinyl alcohol) which copolymers have a mol wt in the range from about 5000 to about 100,000; copolymers of vinyl aromatic monomers with vinyl alcohol, for example poly(styrene-vinyl alcohol), poly(styrene-allyl alcohol), poly(alkyl styrene-allyl alcohol), poly(halostyrene-allyl alcohol), which have a mol wt in the range from about 1000 to about 50,000; polyacetals, for example polyvinyl butyral having a mol wt in the range from about 5000 to about 100,000; phenoxy resins which are poly(hydroxy ethers) derived from diphenols and epihalohydrins, and particularly those resins having an OH content of from 1 to about 10%, obtained with epichlorohydrin and various diphenols such as resins identified in the chapter titled "Phenoxy Resins" in *Ency. Poly. Sci. and Tech.*, Vol 10, pg 111 et seq., John Wiley and Sons, 1964, preferably those having a mol wt in the range from about 2000 to about 50,000; hydroxyalkylated cellulose, particularly hydroxy methyl cellulose, hydroxyethyl cellulose and hydroxypropyl cellulose; and, polyglycidol.

Preferred oxirane monomers are (a) glycidyl ethers having the structure (I) selected from the group consisting of lower alkyl glycidyl ethers having a total of from 4 to about 12 carbon atoms, including methyl glycidyl ether, butyl glycidyl ether, and the like; phenyl glycidyl ether; an alkenyl or substituted alkenyl glycidyl ether having a total of from 5 to about 12 carbon atoms, including vinyl glycidyl ether, allyl glycidyl ether, butenyl glycidyl ether, 4-vinylcyclohexyl glycidyl ether, cyclohexenylmethyl glycidyl ether, o-allyl-phenyl glycidyl ether, and the like; and, (b) a haloalkylene ether having the structure (II) selected from the group consisting of 1-chloro-2,3-epoxypropane (epichlorohydrin); 1-bromo-2,3-epoxypropane (epibromohydrin); 1-chloro-2,3-epoxybutane; 1-iodo-2,3-epoxyhexane; 3-chloro-4,5-epoxyoctane; 1-chloro-2,3-epoxycyclohexane; 1-bromo-2,3-epoxy-3-methylbutane; 2-chloro-2-methyl-3,4-epoxypentane; and the like, having from 3 to about 8 carbon atoms. The most preferred oxirane monomers are butyl glycidyl ether, allyl glycidyl ether, phenyl glycidyl ether and epichlorohydrin.

The temperature employed in the polymerization process of the present invention is usually between about 0° C. and 110° C. However, it is preferred to employ temperatures in the range from about 25° C. to about 80° C., since at these temperatures desirable polymerization rates are obtained without decomposition of the catalyst. It may be desirable, in many cases, to preheat or precool the contents of the reactor to the desired reaction temperature prior to the addition thereto of the catalyst or initiator.

The polymerization reaction is exothermic. However, the reaction temperature is readily maintained by the controlled rate of catalyst addition, and suitable heat exchange means. The time of the polymerization reaction will normally vary from about 1 to about 10 hours and in many cases, will take up to about 24 hours or more, depending upon the particular catalyst used, the amount used, the temperature, and other factors.

The progress of the reaction may be monitored by periodic sampling to determine the amount of monomer converted. On completion of the polymerization, the reaction is terminated by neutralizing the catalyst, generally by adding a slight molar excess of a base such as ammonium hydroxide in an alcoholic (isopropanol) solution. Unreacted monomer, if there is any, may be removed by evaporation under vacuum.

The graft copolymers formed by the process described herein can be of higher mol wt that is, higher than the mol wts heretofore normally obtainable by prior methods for the cationic polymerization of epihalohydrins, as taught for example in the Dreyfuss '856 patent. The polymers will vary from liquids, to semisolids, to solids, and the weight average (wt avg) mol wt of such polymers will vary from about 2000 to about 500,000.

Molecular weights are preferably determined by gel permeation chromatography (GPC) using a Waters Model 200 instrument equipped with a modified Waters R4 differential refractometer detector. The solvent used is THF and flow rate is 2.0 mm³/min, in a column 25 cm×7.8 mm ID, packed with Waters Microstyragel.

The mol wt of block copolymers may also be obtained by determining the OH No. and calculating the number avg mol wt as described in *Preparative Methods of Polymer Chemistry*, Sorenson, W. R. and Campbell, T. W., pg 155, Interscience Publishers, 2nd ed. (1968).

The polymerization process, described herein, may be carried out at autogenous pressures although superatmospheric pressures of up to 10 atmospheres or more may be employed with some advantage with the more volatile monomers. Superatmospheric pressures may also be employed with those monomers and/or solvents having the requisite volatilities at reaction temperatures permitting reflux cooling of the reaction mixture.

The unexpected results of the instant invention are formation of graft copolymers having (i) designed (desired) mol wt, (ii) designed structure, as a result of the positioning of preselected grafting sites, and (iii) precise functionality, (iv) high grafting efficiency, (v) freedom from homo(oxirane) polymer, which graft copolymers are produced with (vi) excellent control of the temperature of polymerization, (vii) high yield, and (viii) high catalyst efficiency. By 'catalyst efficiency' is meant the weight of polymer produced per unit weight of catalyst (initiator) employed. For example, a yield of about 1 kg of polymer to about 10 kg of polymer per (one) gram of catalyst used is obtained by use of the present invention. Such high yields are comparable only to those obtained by the Dreyfuss process mentioned hereinabove. Moreover, because the mol wt and functionality are controlled.

As might be expected, the rate at which each oxirane monomer is polymerized will depend upon its structure, other conditions being the same. It has been found that the rate at which an aromatic glycidyl ether, such as phenyl or naphthyl glycidyl ether, is polymerized, is greater than that of an alkylene glycidyl ether such as allyl glycidyl ether, which in turn is greater than that of a haloalkyl epoxide such as epichlorohydrin. Thus, in the preparation of a block copolymer which is to be aminated, it is generally desirable to polymerize a halogenated glycidyl ether rather than a haloalkyl epoxide if speed of reaction is a primary consideration.

The quaternization ("amination") of polyepihalohydrins is known to yield highly water soluble products useful as coagulants, for example in the treatment of raw sewage, and the breaking of oil-in-water emulsions as disclosed in U.S. Pat. No. 3,591,520. However, as mentioned hereinbefore, the aminated linear block copolymers of the prior art are known to have the property of lyotropic mesomorphism, and "lightly aminated" linear block copolymers, so termed when less than about 10 percent of halogen atoms on one segment, either the A segment or the B segment, are aminated (the other segment is non-aminatable), may be used for the preparation of lyotropic membranes and the like. "More aminated" block copolymers (so termed when more than about 10 percent of the halogen atoms the aminatable segment are aminated), are useful in water-treatment applications particularly as emulsifiers, and also useful as surfactants, sizing agents, anti-static agents ("anti-stats") and the like. Thus, when the graft copolymer of my invention is P(S-co-AA)-g-PECH the PECH segment may be conventionally aminated with an amine capable of an addition reaction with the PECH to yield an aminated block copolymer.

In the aminated graft copolymer, each reactive halogen is typically replaced with $(N^+R_3^6 \cdot X^-)$ alkylammonium halide wherein X represents halogen, usually Cl, Br or I, and $R^6$ is the residue of an amine, identified hereinbelow, used to aminate the graft copolymer. If both the HCB and the oxirane monomer are halo-substituted, and the halogenated HCB and halogenated monomer are blocked together, at least some of the halogen substituents of each block of the block copolymer will be aminated.

If no portion of the aminated graft copolymer is hydrophobic, it will be hydrophilic. Controlled amphiphilicity is most preferably attained by adjusting the length of the PECH block, that is, choosing 'a', and/or choosing the HCB which may have reactive halogen substituents intermediate its OH propagating sites. In addition, the length and structure of the HCB may be chosen, as may the overall mol wt of the polymer, that is, obtaining a predetermined 'b'.

Segments of PECH are the most preferred if graft copolymers of this invention are to be aminated. Amination of the chloromethyl groups in PECH with a wide variety of aliphatic and aromatic amines is known to produce the corresponding ammonium salt which provides cationic charges and imparts hydrophilicity to the polymer. It is known that amination of PECH may be effected in such a manner as to convert the normally hydrophobic PECH to a hydrophilic polymer, but a polymer with amphiphilic properties, that is, having both hydrophilic and hydrophobic characteristics, is difficult to obtain. Controlled amphiphilic properties are of especial interest in the 'fabrication' of water-treatment chemicals. The graft copolymers of this invention may be tailored so that the degree of hydrophilicity or amphiphilicity may be controlled by the structure of the graft copolymer, the type of amine used to aminate it, and the number of chloromethyl groups which are actually aminated.

When PECH is the segment to be aminated, the aminated graft copolymer has the structure

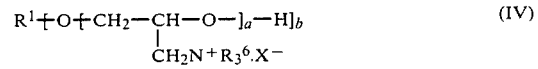
(IV)

wherein X represents a halogen, $R^1$ has the same connotation as for structure (III) hereinabove, $R^6$ is the residue of an amine used to aminate the graft copolymer, and 'a' and 'b' represent numerals defined as for said structure (III).

Any conventionally used amine may be used for aminating PECH. Preferred amines are selected from the group consisting of: alkylamines, dialkylamines, and trialkylamines having from 1 to about 30 carbon atoms, and more preferably from 1 to about 6 carbon atoms; cyclic alkylamines having from 5 to about 7 carbon atoms, more preferably cyclohexylamine; fatty amines having from 10 to about 50 carbon atoms; polymeric amines and polyetheramines having a mol wt in the range from about 100 to about 500; alkanolamines having from 1 to about 30 carbon atoms, and more preferably from 1 to about 6 carbon atoms; morpholine; pyridine; aniline; thiazines; and silane-containing amines having from 5 to about 20 carbon atoms.

Preferred for amination are graft copolymers with a multiplicity of reactive chlorine atoms so that at least 20 percent of all Cl atoms are aminated. When the residue is non-aminatable, and a segment of the copolymer is aminatable, the aminated copolymer will be amphiphilic.

Amination is usually effected using a predetermined stoichiometric amount of the amine, or a slight excess over the amount calculated as being necessary to effect the desired degree of amination. A solvent, such as a lower alkyl cyanide such as acetonitrile, an aliphatic ketone having from 2 to about 20 carbon atoms, particularly acetone, or even water, may be used to obtain a homogeneous solution, though obtaining such a solution is not necessary. It is preferred for amination, to use graft copolymers which do not require a solvent. The reaction is carried out in the range from about 40° C. to about 150° C., and autogenous pressure. It will be recognized that, when the amine is gaseous under the conditions of amination, the reaction is preferably carried out under elevated pressure in the range from about 50 psig to about 500 psig.

The unaminated graft copolymers of this invention are useful for protective coatings on metal and other substrates, to prepare flame-resistant foams, films and fibers, to form bottles or envelope glass bottles, to impregnate paper and textile fabrics, and as binders for nonwoven materials. These graft copolymers are especially useful when blended with other polymers to give especially desirable properties, for example excellent resistance to water vapor transmission.

The aminated graft copolymers of this invention are particularly useful in water treatment as flocculating agents, demulsifiers and microbiocides when used in relatively small amounts in the range from 5 parts per million (ppm) to about 2000 ppm. The aminated graft copolymers are also excellent sizing agents for glass fiber when used in an amount in the range from about 0.1 to about 5% by weight of the fiber, the aminated PECH grafted polyacetals being most preferred for this application.

The following examples serve to illustrate the invention. Where not otherwise stated, parts are given as parts by weight and the temperatures in degrees centigrade.

EXAMPLE 1

A. HCB is a monohydroxy-polyalkane having a single pendant OH group and no terminal OH groups, for example 4-decanol:

15.8 g of 4-decanol and 92.5 g of epichlorohydrin (ECH) are mixed in a three-necked flask fitted with a mechanical stirrer, a thermometer and a rubber septum, and 0.09 g of TEOP dissolved in $CH_2Cl_2$ gradually added while the contents of the flask are maintained at about 30° C. The polymerization is carried out overnight to yield a graft copolymer in which about 10 ECH units are grafted from the pendant OH group of 4-decanol, indicating nearly 100% conversion.

B. HCB is a polyalkane-triol having two pendant OH groups and a single terminal OH group, for example, 1,8,9-trihydroxy-octadecane:

In a manner analogous to that described in example 1A hereinabove, 30.2 g of 1,8,9-trihydroxy-octadecane, 138.7 g of ECH and 0.15 g of TEOP are mixed in a flask and polymerized overnight to yield a graft copolymer in which each OH group has a chain of about 5 ECH units attached to it, indicating nearly 100% conversion of the monomer.

EXAMPLE 2

HCB has two pendant OH groups and no terminal OH groups, as for example, 8,9-dihydroxy-octadecane:

In a manner analogous to that described in example 1A hereinabove, 28.6 g of 8,9-dihydroxy-octadecane, 92.5 g of ECH and 0.09 g of TEOP dissolved in methylene chloride, are mixed in a large flask and the polymerization continued overnight at 30° C. to yield a graft copolymer having 5 ECH units in each grafted segment indicating essentially 100% conversion of the monomer.

In each of the foregoing examples, essentially no homopolymer of ECH is found. Referring particularly to example 2, it is noted that the pendant OH groups are attached to adjacent C atoms in the backbone. The proximity of the OH groups appears not to affect the grafting of the ECH on each of the OH groups, presumably because there is no adverse steric hindrance. However, it is preferred, particularly where the mol wt of the HCB backbone is above 1000 to have sufficient distance between adjacent pendant OH groups to permit each OH group to act as a grafting site. This distance may be relatively small if the mol wt of the HCB is relatively low.

EXAMPLE 3

HCB is polyglycidol having a mol wt in the range from 500 to about 10,000:

In a manner analogous to that described hereinabove in example 1A, 7.4 g polyglycidol, 92.5 g ECH and 0.068 g TEOP in 5 ml of $CH_2Cl_2$ were polymerized overnight at 30° C. until the conversion was nearly 100%. GPC analysis indicated $\overline{Mn}=2150$ and $\overline{Mw}=21800$.

It will be seen from the foregoing that there are at least three C atoms separating adjacent OH groups in polyglycidol, and this is generally sufficient separation in most of the commonly available HCBs.

EXAMPLE 4

A. HCB is P(S-co-AA) having a mol wt of about 1600 and a OH content in the range from about 5.4–6.0%, and the repeating unit has the structure

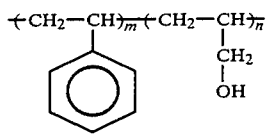

wherein m and n are integers the values of which are calculated from the mol wt and the OH content.

92.5 g (1 mol) of ECH and 29.8 g of P(S-co-AA) was charged to a 250 ml flask fitted with a mechanical stirrer, thermometer and rubber septum. The flask was purged with dry nitrogen. To the above mixture was added 0.084 g of TEOP in 5 ml of $CH_2Cl_2$ by hypodermic syringe at 30° C. The polymerization was carried out at 30° C. for 23 hr, intermittently cooled with an ice-bath when necessary, to yield about 95% conversion of ECH to polymer. The OH No. of the polymer was found to be 53. The theoretical OH No. is in the range 44–49.

GPC analysis showed that the polymer formed had a monomodal distribution, and $\overline{Mn}=3780$ and $\overline{Mw}=14,800$.

B. Amination of the graft copolymer formed in example 4A:

122 g of the P(S-co-AA)-g-PECH graft copolymer obtained in example 4A hereinabove, and 45 g dimethylamine are charged into a 1 quart pressure bottle and heated to 60° C. for about 27 hr. The pressure in the bottle dropped from about 78 psig to about 22 psig. To the aminated product was added about 35 ml of water and it formed a slightly yellow solution. Analyses showed that the polymer contained 5.2% chloride ion indicating that about 55% of the PECH segments are aminated.

EXAMPLE 5

A. HCB is polyvinylbutyral having a mol wt of about 36,000 and a OH content (as polyvinyl alcohol) of from about 9% to about 13% with a repeating unit having the structure

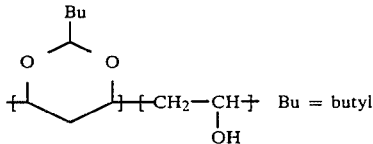

A 500 ml flask fitted with a mechanical stirrer, thermometer, and rubber septum were charged with 15.4 g of polyvinyl butyral (PVB) commercially available under the Butvar ® B-79 brand from Monsanto Chemical Co., 46.3 g of ECH and 144 g of methylene chloride. After the PVB dissolved completely, 0.2 g of TEOP in 5 ml of $CH_2Cl_2$ was added at 30° C. The polymerization was carried out at 30° C. After 3 hr, an additional amount of 0.2 g of TEOP in 2 ml of $CH_2Cl_2$ was added. When the polymerization continued, the viscosity increased, so a total of 50 g of $CH_2Cl_2$ was added in increments after 5 hr, 5.5 hr, and 6.5 hr respectively. After 11.5 hr the polymerization was terminated with a mixture of ammonium hydroxide and isopropanol. ECH conversion was 65%. The GPC showed a broad monomodal distribution and $\overline{Mm}=25400$; $\overline{Mw}=100000$.

B. Amination of the graft copolymer formed in example 5A:

280 g of PVB-g-PECH formed in example 2A hereinabove (containing 133 g of PECH) was dissolved in 576 g acetone and aminated with 85 g trimethylamine using 500 ml of water in an autoclave at 100° C. for 8 hr to give a PVB-g-PECH quaternary ammonium salt. Cl analysis indicated that approximately 60% of the ECH in the segments were aminated.

EXAMPLE 6

HCB is hydroxypropyl cellulose:

69.4 g of ECH and 16.8 of hydroxypropyl cellulose commercially obtainable as Klucel ®E type, having a mol wt of about 60,000 are charged to a flask in a manner analogous to that described hereinbefore for example 2, and 0.08 g of TEOP in 28.8 g of $CH_2Cl_2$ added to the flask while it is maintained at 30° C. Additional amounts of 0.08 g of TEOP are added after 3 hr and 5 hr respectively, and the polymerization continued for 30 hr, after which it was stopped as before in example 2, and analyzed. It was found that 77% of the ECH is polymerized. The polymer formed is found to have the structure of a graft block copolymer. It gives a tough film when a solution of the polymer is cast on a glass plate.

EXAMPLE 7

A. The HCB is a phenoxy resin in which the repeating unit has the structure

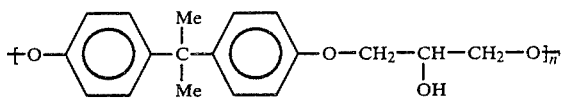

wherein n' is an integer in the range from about 7 to about 400, and the oxirane monomer is ECH, and the OH content is in the range from 1 to 10%.

46.3 g of ECH and 28.4 of a phenoxy resin obtained under the Ucar ®PKHC brand from Union Carbide Corp. were placed in a flask with 75 g of methylene chloride and 0.05 g TEOP at 30° C. in a manner analogous to that described in example 2 hereinabove. Additional TEOP (0.05 g) was added after 3 hr and the polymerization allowed to continue at 30° C. for 72 hr, and yields 58.9 g of a graft block copolymer, confirmed upon GPC analysis. The polymer gives a clear transparent flexible film when a solution of the polymer is cast on a glass plate.

B. The HCB is a phenoxy resin such as is used in example 7A hereinabove, and the oxirane monomer is butyl glycidyl ether (BGE):

In a manner analogous to that described in example 7A hereinabove, 28.4 g of the phenoxy resin and 65 g BGE are dissolved with 0.15 g TEOP in 75 g of $CH_2Cl_2$ to form a homogeneous reaction mass which is stirred while it polymerizes at 30° C. overnight until all the monomer is converted. It is found that the graft copolymer formed has about 5 BGE units attached to each of the OH grafting sites on the phenoxy resin, indicating better than 90% conversion.

I claim:

1. A graft copolymer from a polymer having a hydroxyl-containing backbone (HCB) having the structure $R^1(OH)_n$ wherein n represents an integer in the range from 1 to about 400, wherein from 1 to about 200 are pendant OH groups, the remaining groups, if any, being terminal, and, an oxirane monomer, said graft copolymer having the structure $$R^1[O[A_{-a}-H]_b \quad (III)$$

wherein, $R^1$ represents the residue of said HCB;

A represents a single ring-openable oxirane monomer selected from the group consisting of (i) an aliphatic or aromatic glycidyl ether having the structure $$R^2-\overset{O}{\overset{/\backslash}{CH-\!\!\!-\!\!\!-CH}}-CH_2-O-R^3 \quad (I)$$

wherein $R^2$ and $R^3$ is each independently selected from the group consisting of hydrogen, alkyl having from 1 to about 40 carbon atoms, haloalkyl, alkenyl having from 2 to about 40 carbon atoms, haloalkenyl, alkoxyalkyl having from 1 to about 40 carbon atoms, aryl(Ar) or substituted aryl(Ar-Q), wherein Q is selected from the group consisting of alkyl, haloalkyl each having from 1 to about 10 carbon atoms, alkenyl and haloalkenyl each having from 2 to about 10 carbon atoms; and, (ii) a haloalkyl epoxide having the structure $$R^4-\overset{O}{\overset{/\backslash}{CH-\!\!\!-\!\!\!-CH}}-CHX-R^5 \quad (II)$$

wherein X is a halogen atom and $R^4$ and $R^5$ is each independently selected from the group consisting of hydrogen and alkyl having from 1 to about 4 carbon atoms;

so that the molecular weight of the resulting graft copolymer is directly proportional to the amount of monomer converted; and, a represents an integer in the range from about 1 to about 100;

b represents an integer in the range from 1 to about 400;

so that the molecular weight of each grafting chain of said graft copolymer is in the range from about 100 to about 10,000, and the molecular weight of the overall graft copolymer is in the range from about 2000 to about 500,000.

2. The graft copolymer of claim 1 wherein said HCB is a polymer having a molecular weight in the range of from about 1000 to about 200,000, and said $R^1$ is the residue of said polymer which is selected from the group consisting of hydroxyalkyl cellulose; polyglycidol; polyvinylacetals having an OH content in the range from 1 to about 20%; poly(hydroxy ether) resins including copolymers of a polyhydroxy phenols and an epihalohydrin; and, copolymers of a monoolefinically unsaturated alcohol with a member selected from the group consisting of a vinyl aromatic monomer, and a monoolefin, each of which members may be substituted, in which copolymers the OH content is in the range of from about 1 to about 20%; and, each said polymer of the group is characterized by having from 5 to about 400 pendant OH groups, so that said graft copolymer has a mol wt in the range from about 5000 to about 500,000.

3. The graft copolymer of claim 2 wherein said HCB is selected from the group consisting of hydroxymethyl cellulose, hydroxymethyl cellulose, hydroxypropyl cellulose, hydroxybutyl cellulose; polyglycidol having a mol wt in the range from about 500 to about 15,000; polyvinyl formal, polyvinyl ethyral and polyvinyl butyral having a mol wt in the range from about 5000 to about 100,000; a phenoxy resin comprising a condensation product of polyhydroxy phenols and an epihalohydrin said phenoxy resin having a mol wt in the range of from about 2000 to about 50,000; copolymers of a vinylaromatic monomer and a monoolefinically unsaturated alcohol having a mol wt in the range of from about 1000 to about 50,000; and, copolymers of vinyl alcohol with a member selected from the group consisting of ethylene, propylene and vinyl chloride.

4. The graft copolymer of claim 3 wherein said HCB has from about 7 to about 100 pendant OH groups, and optionally from 0 to 4 terminal OH groups.

5. The graft copolymer of claim 4 wherein said aliphatic glycidyl ether is selected from the group consisting of an alkyl glycidyl ether, a cycloalkyl glycidyl ether, an alkenyl glycidyl ether and a cycloalkenyl glycidyl ether; and said aryl glycidyl ether is selected from the group consisting of phenyl glycidyl ether and biphenyl glycidyl ether.

6. The graft copolymer of claim 5 wherein said alkyl glycidyl ether is selected from the group consisting of methyl glycidyl ether, propyl glycidyl ether and butyl glycidyl ether; said alkenyl glycidyl ether is selected from the group consisting of vinyl glycidyl ether, allyl glycidyl ether, butenyl glycidyl ether, 4-vinylcyclohexyl glycidyl ether, cyclohexenylmethyl glycidyl ether, and o-allyl-phenyl glycidyl ether; and said haloalkyl epoxide is selected from the group consisting of 1-chloro-2,3-epoxypropane(epichlorohydrin), 1-bromo-2,3-epoxypropane(epibromohydrin), 1-chloro-2,3-epoxybutane, 1-iodo-2,3-epoxyhexane, 3-chloro-4,5-epoxyoctane, 1-chloro-2,3-epoxycyclohexane; 1-bromo-2,3-epoxy-3-methylbutane; and, 2-chloro-2-methyl-3,4-epoxypentane.

7. The graft copolymer of claim 5 wherein said HCB is selected from the group consisting of hydroxypropyl cellulose having a mol wt in the range of from about 10,000 to about 100,000; polyvinyl butyral having an OH content of from about 1 to about 20%; and, poly(styrene-co-allyl alcohol) having a mol wt in the range of from about 1000 to about 10,000 and an OH content of from about 1 to about 20%.

8. The graft copolymer of claim 1 wherein said grafting chain and, optionally, $R^1$, contains a reactive halogen capable of an addition reaction with an amine to yield an aminated block copolymer.

9. The block copolymer of claim 8 wherein said aminated block copolymer is an amphiphilic block copolymer having the structure $$R^1\!+\!O\!+\!CH_2\!-\!\underset{\underset{CH_2N^+R_3^6.X^-}{|}}{CH}\!-\!O\!-\!]_a\!-\!H]_b \quad (IV)$$

wherein X represents a halogen, and $R_3^6$ is the residue of an amine selected from the group consisting of an alkylamine, dialkylamine, trialkylamine, cyclic alkylamine, fatty amine, polymeric amine, aromatic amine, polyetheramine, alkanolamine, thiazine, morpholine and a silane-containing amine.

10. The aminated block copolymer of claim 9 wherein said grafting chain is polyepichlorohydrin, and said amine is a lower alkylamine having from 1 to about 6 carbon atoms.

11. The amphiphilic block copolymer of claim 9 wherein at least 20 percent of all reactive halogens are aminated.

12. The amphiphilic block copolymer of claim 9 wherein said grafting chain is selected from the group consisting of allyl glycidyl ether, phenyl glycidyl ether and a lower alkyl glycidyl ether, said lower alkyl having from 1 to about 6 carbon atoms.

13. A process for the manufacture of a graft copolymer having the structure (III) by grafting from a polymer having a hydroxyl-containing backbone (HCB) with an oxirane monomer, which process comprises,
(i) polymerizing, said HCB with a single oxirane monomer selected from the group consisting of an acyclic glycidyl ether, a cyclic glycidyl ether, and a haloalkyl epoxide, in the presence of a catalytic amount from about 0.001 part to about 1 part per 100 parts by wt of oxirane reactants, of a catalyst selected from the group consisting of an $HMF_6$ acid, and, an oxonium salt of the $HMF_6$ acid, wherein M is an element selected from the group consisting of phosphorus, arsenic and antimony, at a temperature in the range from about 0° C. to about 150° C., at ambient or slightly elevated pressure, and,
(ii) recovering said graft copolymer which is formed in an amount directly proportional to the conversion of monomer.

14. The process of claim 13 wherein said HCB is a polymer having a molecular weight in the range of from about 1000 to about 200,000, and said $R^1$ is the residue of said prepolymer which is selected from the group consisting of hydroxyalkyl cellulose, polyvinylacetals having a OH content in the range from 1 to about 20%, poly(hydroxy ether) resins including a condensation product of an epihalohydrin and polyhydroxy phenols which resins have an OH content from about 1 to about 10%; and, copolymers of vinyl aromatic monomers with monoolefinically unsaturated alcohols which copolymers have an OH content of from about 1 to about 20%; each residue characterized by having from 7 to about 100 pendant OH groups, so that the graft copolymer has a mol wt in the range from about 5000 to about 500,000.

15. The process of claim 14 wherein said HCB is selected from the group consisting of hydroxymethyl cellulose, hydroxyethyl cellulose, hydroxypropyl cellulose, hydroxybutyl cellulose, polyvinyl formal, polyvinyl ethyral and polyvinyl butyral having a mol wt in the range from about 10,000 to about 50,000; a phenoxy resin comprising a condensation product of polyhydroxy phenols and an epihalohydrin said phenoxy resin having a mol wt in the range of from about 10,000 to about 100,000; and, a copolymer of a vinylaromatic monomer and a monoolefinically unsaturated alcohol, having a mol wt in the range of from about 1000 to about 100,000.

16. The process of claim 15 wherein said acyclic glycidyl ether is selected from the group consisting of methyl glycidyl ether, propyl glycidyl ether and butyl glycidyl ether, said cyclic glycidyl ether is selected from the group consisting of phenyl glycidyl ether and biphenyl glycidyl ethers; an alkenyl glycidyl ether selected from the group consisting of vinyl glycidyl ether, allyl glycidyl ether, butenyl glycidyl ether, 4-vinylcyclohexyl glycidyl ether, cyclohexenylmethyl glycidyl ether, and o-allyl-phenyl glycidyl ether; and a said haloalkyl epoxide is selected from the group consisting of 1-chloro-2,3-epoxypropane(epichlorohydrin), 1-bromo-2,3-epoxypropane(epibromohydrin), 1-chloro-2,3-epoxybutane, 1-iodo-2,3-epoxyhexane, 3-chloro-4,5-epoxyoctane, 1-chloro-2,3-epoxycyclohexane; 1-bromo-2,3-epoxy-3-methylbutane; and, 2-chloro-2-methyl-3,4-epoxypentane.

17. The process of claim 16 wherein said HCB is selected from the group consisting of hydroxypropyl cellulose having a mol wt in the range of from about 10,000 to about 100,000; polyvinyl butyral having an OH content of from about 1 to about 10% calculated as polyvinylalcohol; and poly(styrene-co-allyl alcohol) having a mol wt in the range of from about 1000 to about 50,000.

18. The process of claim 13 wherein a grafting chain of said graft copolymer contains a reactive halogen capable of an addition reaction with an amine and, optionally, $R^1$ of said graft copolymer contains a reactive halogen capable of an addition reaction with an amine, so as to have formed a halogen-containing graft copolymer, said process including, in addition, contacting said halogen-containing graft copolymer with a preselected amount of an amine sufficient to aminate a preselected amount of said reactive halogen, optionally in the presence of a solvent for said amine and said halogen-containing graft copolymer, at a temperature in the range from about 40° C. to about 110° C., and a pressure in the range from about 50 to about 500 psig.

19. The process of claim 18 wherein said halogen-containing graft copolymer includes a chain aminated with an amine selected from the group consisting of an alkylamine, dialkylamine, trialkylamine, cyclic alkylamine, fatty amine, polymeric amine, aromatic amine, polyetheramine, alkanolamine, thiazine, morpholine and a silane-containing amine.

20. The process of claim 19 wherein said grafting chain is polyepichlorohydrin, and said amine is a lower alkylamine having from 1 to about 6 carbon atoms.

21. The process of claim 19 wherein at least 20 percent of all reactive halogens are aminated.

22. The process of claim 19 wherein said grafting chain is selected from the group consisting of poly(allyl glycidyl ether), poly(phenyl glycidyl ether) and a poly(lower alkyl glycidyl ether) said lower alkyl having from 1 to about 6 carbon atoms.

* * * * *